(12) United States Patent
Stahl et al.

(10) Patent No.: US 9,619,787 B2
(45) Date of Patent: Apr. 11, 2017

(54) DYNAMIC ALERTS FOR CALENDAR EVENTS

(71) Applicant: Apple Inc., Cupertino, CA (US)

(72) Inventors: Geoffrey G. Stahl, San Jose, CA (US); Teck Yang Lee, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/960,255

(22) Filed: Dec. 4, 2015

(65) Prior Publication Data

US 2016/0162843 A1 Jun. 9, 2016

Related U.S. Application Data

(63) Continuation of application No. 14/179,435, filed on Feb. 12, 2014, now Pat. No. 9,207,084, which is a continuation of application No. 13/863,725, filed on Apr. 16, 2013, now Pat. No. 8,660,790, which is a continuation of application No. 12/627,944, filed on Nov. 30, 2009, now Pat. No. 8,423,288.

(51) Int. Cl.
| | |
|---|---|
| *G06Q 10/10* | (2012.01) |
| *G01C 21/34* | (2006.01) |
| *G01C 21/26* | (2006.01) |
| *G01C 21/36* | (2006.01) |
| *G01C 21/00* | (2006.01) |
| *G04B 19/24* | (2006.01) |
| *G04G 21/00* | (2010.01) |
| *G06Q 10/04* | (2012.01) |

(52) U.S. Cl.
CPC ......... *G06Q 10/1095* (2013.01); *G01C 21/00* (2013.01); *G01C 21/26* (2013.01); *G01C 21/343* (2013.01); *G01C 21/3492* (2013.01); *G01C 21/362* (2013.01); *G04B 19/24* (2013.01); *G04G 21/00* (2013.01); *G06Q 10/109* (2013.01); *G06Q 10/1093* (2013.01); *G06Q 10/047* (2013.01)

(58) Field of Classification Search
CPC ........... G06Q 10/1093; G06Q 10/1095; G06Q 10/047; G06Q 10/109; G01C 21/362; G01C 21/26; G01C 21/3492; G01C 21/343; G01C 21/00
See application file for complete search history.

(56) References Cited

U.S. PATENT DOCUMENTS

| | | | | |
|---|---|---|---|---|
| 6,940,395 | B2 * | 9/2005 | Steinmark | G08B 21/24 340/309.16 |
| 2003/0001727 | A1 * | 1/2003 | Steinmark | G08B 21/24 340/309.16 |
| 2003/0060979 | A1 * | 3/2003 | Andrews | G01C 21/20 701/408 |
| 2008/0167937 | A1 * | 7/2008 | Coughlin | G01C 21/20 705/7.16 |
| 2008/0167938 | A1 * | 7/2008 | Meisels | G06Q 10/063116 705/7.16 |

(Continued)

*Primary Examiner* — Jason Holloway
(74) *Attorney, Agent, or Firm* — Downey Brand LLP

(57) ABSTRACT

A computing device can access a calendar entry having an associated time and an associated location, in a calendar application. The computing device can dynamically determine an estimated travel time to the location associated with the calendar entry. The computing device can provide an alarm indication for the calendar entry at a time based on the estimated travel time.

20 Claims, 8 Drawing Sheets

(56) References Cited

U.S. PATENT DOCUMENTS

| | | | |
|---|---|---|---|
| 2009/0192702 A1* | 7/2009 | Bourne | G01C 21/20 701/532 |
| 2010/0069054 A1* | 3/2010 | Labidi | G01C 21/20 455/418 |
| 2010/0179750 A1* | 7/2010 | Gum | G01C 21/362 701/533 |
| 2010/0228473 A1* | 9/2010 | Ranford | G01C 21/26 701/465 |

* cited by examiner

DYNAMIC ALERTS FOR CALENDAR EVENTS

CROSS-REFERENCE TO RELATED APPLICATIONS

This application is a continuation of U.S. application Ser. No. 14/179,435 filed Feb. 12, 2014, which is a continuation of U.S. application Ser. No. 13/863,725 filed Apr. 16, 2013, which is a continuation of U.S. application Ser. No. 12/627,944, filed Nov. 30, 2009, the contents of which are incorporated by reference herein in their entirety for all purposes.

The present application is also related to commonly-owned U.S. patent application Ser. No. 12/163,862, filed Jun. 27, 2008, entitled "Integrated Calendar And Map Applications In A Mobile Device," now U.S. Pat. No. 9,175,964 issued Nov. 3, 2015.

FIELD

This invention generally relates to the field of electronic consumer products, such as computing devices, and particularly to devices which can implement or communicate with an electronic calendar.

BACKGROUND

Mobile or other computing devices often provide a number of services such as telephony services, email communication, a way to organize addresses and contacts, a way to play media content, and other services. Certain computing devices may also provide a calendar application to keep track of appointments and a mapping application to provide location information and/or travel directions. The calendar application stores the details of an appointment as a calendar entry. The details of a calendar entry may include the date, time, location, duration, subject, and participants for an appointment or meeting.

The calendar application may also be configured to provide an alarm indication (e.g., an alert or reminder) for a calendar entry, a certain length of time before the start of the appointment. Conventional alarm indications are set for some default period of time before the start of the appointment.

SUMMARY

A device can access a calendar entry having an associated time and an associated location in a calendar application. The device, which can be a mobile or non-mobile computing device, can dynamically determine an estimated travel time to the location associated with the calendar entry. The computing device can provide an alarm indication for the calendar entry at an alarm time based on the estimated travel time. Changing road or travel conditions or a change from an expected previous location can all cause the travel time to change and one or more embodiments can be configured to determine, before the scheduled time, what the current estimate is for the travel time.

Various systems, methods, and machine readable storage media which can embody or implement one or more embodiments are described.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Embodiments are described to provide a dynamic alert for a calendar entry. In one embodiment, a mobile computing device, or other data processing system, can store or have access to a calendar entry having an associated time and an associated location, in a calendar application. The mobile computing device, or other data processing system, can dynamically determine an estimated travel time from the current location of the mobile computing device, or other data processing system, to the location associated with the calendar entry. The mobile computing device, or other data processing system, can provide an alarm indication for the calendar entry at a time based on the estimated travel time. The estimated travel time may be calculated based on one or more of: historical travel information; current road conditions; current traffic information; mass transit scheduling information; event scheduling information; and/or some other form of travel information. If the estimated travel time compares in a predetermined manner (e.g., is greater than or equal) to the difference between a scheduled event time and the current time, an alarm indication can be provided. If the estimated travel time is less than the difference, the scheduled alarm time can be updated, so that in the event of a lost network connection, the alarm time is as up-to-date as possible. The estimated travel time can be dynamically calculated to be continually updated with new travel information up until and beyond the time that the alarm indication is provided.

Figure 1:
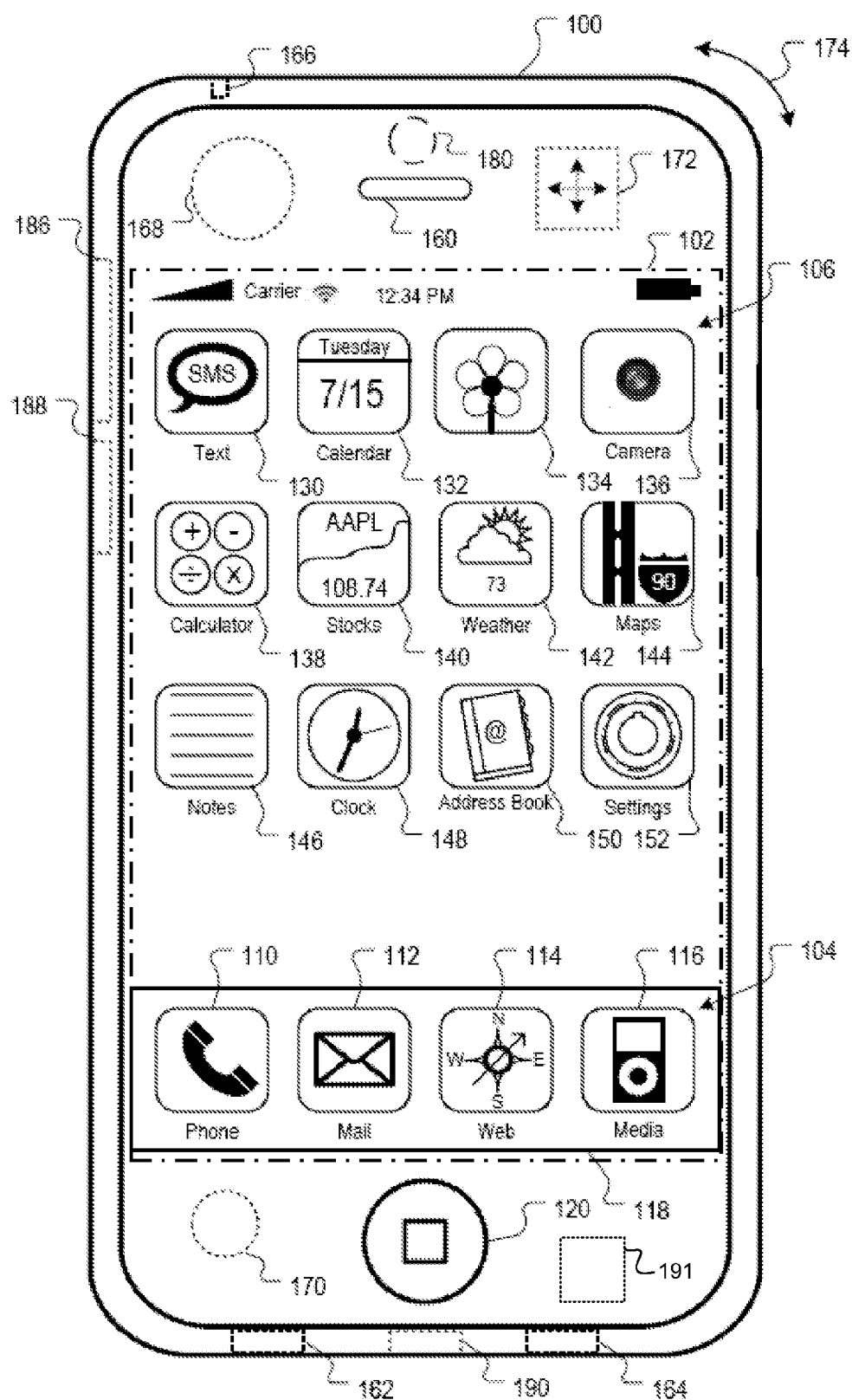
FIG. 1 is a block diagram illustrating a mobile computing device, according to an embodiment.

FIG. 1 is a block diagram of an example mobile computing device 100. The mobile computing device 100 can be, for example, a handheld computer, a personal digital assistant, a laptop computer or other computer system, a cellular telephone, a network appliance, a camera, a smart phone, an enhanced general packet radio service (EGPRS) mobile phone, a network base station, a media player, a navigation device, an email device, a game console, some other electronic device, or a combination of any two or more of these data processing devices or other data processing devices.

In one embodiment, the mobile computing device 100 can include a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In one embodiment, the touch-sensitive display 102 comprises a multi-touch-sensitive display. A multi-touch-sensitive display can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which a point of contact is made using a stylus or other pointing device.

In one embodiment, the mobile computing device 100 can display one or more graphical user interfaces on the touch-sensitive display 102 for providing the user access to various system objects and for conveying information to the user to facilitate an intuitive user experience. In one embodiment, the graphical user interface can include one or more display objects 104, 106. In the example shown, the display objects 104, 106 are graphic representations of system objects. Some examples of system objects include device functions, applications, windows, files, alerts, events, or other identifiable system objects.

In one embodiment, the mobile computing device 100 can implement multiple device functionalities, such as a telephony device, as indicated by a phone object 110; an e-mail device, as indicated by the e-mail object 112; a network data communication device, as indicated by the Web object 114; and a media processing device, as indicated by the media player object 116. In one embodiment, particular display objects 104, e.g., the phone object 110, the e-mail object 112, the Web object 114, and the media player object 116, can be displayed in a menu bar 118. In one embodiment, each of the device functionalities can be accessed from a top-level graphical user interface, such as the graphical user interface illustrated in FIG. 1. Touching one of the objects 110, 112, 114 or 116 can, for example, invoke the corresponding functionality.

In one embodiment, the mobile computing device 100 can implement network distribution functionality. For example, the functionality can enable the user to take the mobile computing device 100 and its associated network while traveling. In particular, the mobile computing device 100 can extend Internet access (e.g., via Wi-Fi, 3G, or Edge) to other wireless devices in the vicinity. For example, mobile computing device 100 can be configured as a base station for one or more devices. As such, mobile computing device 100 can grant or deny network access to other wireless devices.

In one embodiment, upon invocation of particular device functionality, the graphical user interface of the mobile computing device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various email functions; touching the Web object 114 may cause the graphical user interface to present display objects related to various Web-surfing functions; and touching the media player object 116 may cause the graphical user interface to present display objects related to various media processing functions.

In one embodiment, the top-level graphical user interface environment or state of FIG. 1 can be restored by pressing a button 120 located near the bottom of the mobile computing device 100. In some implementations, each corresponding device functionality may have corresponding "home" display objects displayed on the touch-sensitive display 102. The graphical user interface environment of FIG. 1 can be restored by touching the "home" display object.

In one embodiment, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. In one embodiment, the display objects 106 can be configured by a user, e.g., a user may specify which display objects 106 are displayed, and/or may download additional applications or other software that provides other functionalities and corresponding display objects.

In one embodiment, the mobile computing device 100 can include one or more input/output (I/O) devices and/or sensor devices. For example, a speaker 160 and a microphone 162 can be included to facilitate voice-enabled functionalities, such as phone and voice mail functions. In one embodiment, a loud speaker 164 can be included to facilitate hands-free voice functionalities, such as speaker phone functions. An audio jack 166 can also be included for use of headphones and/or a microphone.

In one embodiment, a proximity sensor 168 can be included to facilitate the detection of the user positioning the mobile computing device 100 proximate to the user's ear and, in response, to disengage the touch-sensitive display 102 to prevent accidental function invocations. In one embodiment, the touch-sensitive display 102 can be turned off to conserve additional power when the mobile computing device 100 is proximate to the user's ear.

Other sensors can also be used. For example, in one embodiment, an ambient light sensor 170 can be utilized to facilitate adjusting the brightness of the touch-sensitive display 102. In one embodiment, an accelerometer 172 can be utilized to detect movement of the mobile computing device 100, as indicated by the directional arrow 174. Accordingly, display objects and/or media can be presented according to a detected orientation, e.g., portrait or landscape. In one embodiment, the mobile computing device 100 may include circuitry and sensors for supporting a location determining capability, such as that provided by the global positioning system (GPS). In one embodiment, a positioning system (e.g., a GPS receiver) can be integrated into the mobile computing device 100 through an interface (e.g., port device 190) to provide access to location-based services. In another embodiment, a positioning system can be disposed within mobile computing device 100 (e.g., GPS receiver 191).

The mobile computing device 100 can also include a camera lens and sensor 180. In some implementations, the camera lens and sensor 180 can be located on the front and/or back surface of the mobile computing device 100. The camera can capture still images and/or video.

The mobile computing device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In one embodiment, a port device 190, e.g., a Universal Serial Bus (USB) port, or a docking port, or some other wired port connection, can be included. The port device 190 can, for example, be utilized to establish a wired connection to other computing devices, such as other communication devices, a personal computer, a printer, or other processing devices capable of receiving and/or transmitting data. In one embodiment, the port device 190 allows the mobile computing device 100 to synchronize with a host device using one or more protocols, such as, for example, a TCP/IP over USB protocol.

Figure 2:
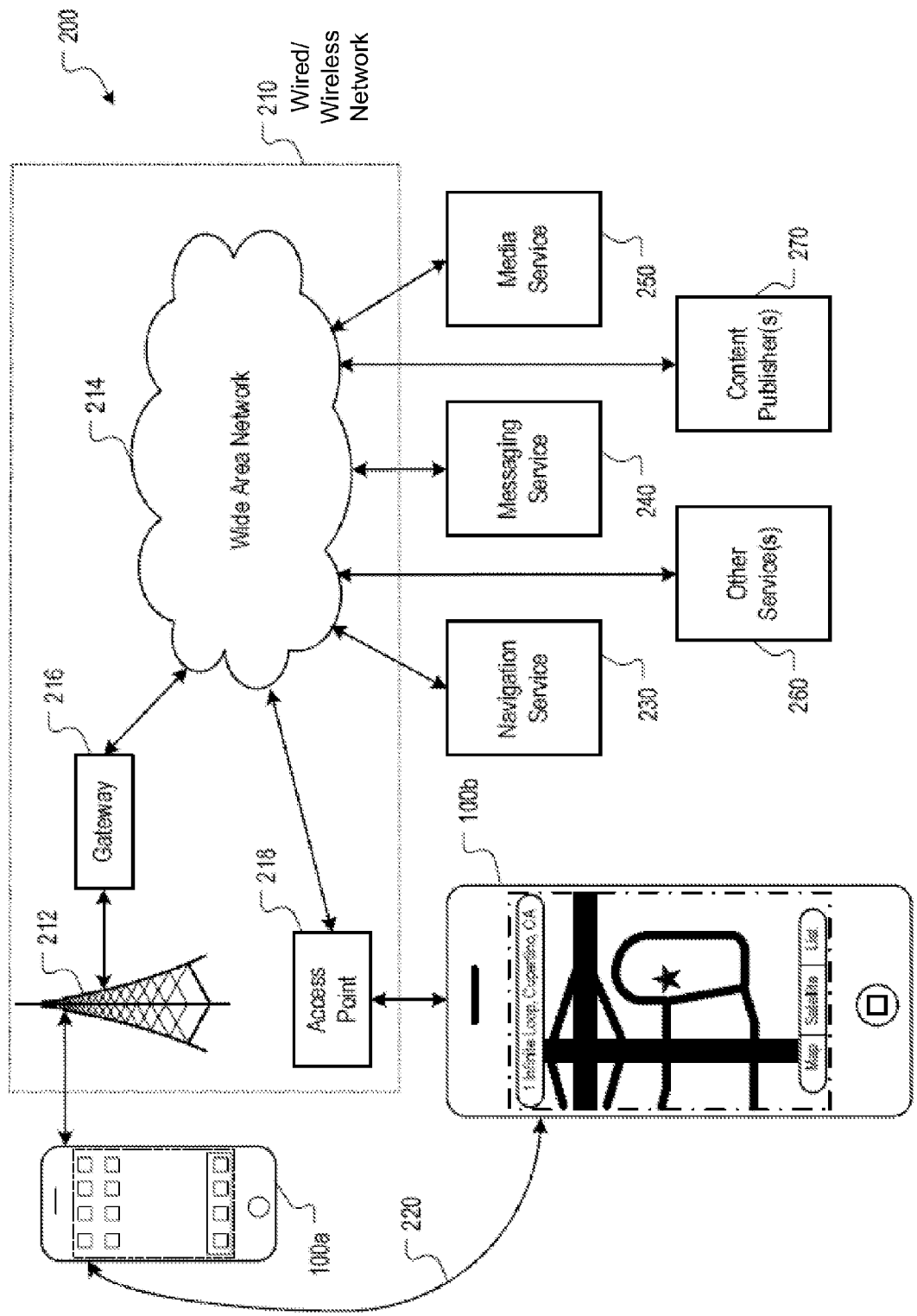
FIG. 2 is a block diagram illustrating a network operating environment for a mobile computing device, according to an embodiment.

FIG. 2 is a block diagram of an example network operating environment 200 for the mobile computing device 100 of FIG. 1 or for other electronic devices. The mobile computing device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile computing device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile computing device 100b can place and receive phone calls, send and receive e-mail messages, and retrieve electronic documents over the access point 218 and the wide area network 214. In some implementations, the mobile computing device 100b can be physically connected to the access point 218 using one or more cables and the access point 218 can be a personal computer. In this configuration, the mobile computing device 100b can be referred to as a "tethered" device.

The mobile computing devices 100a and 100b can also establish communications by other means. For example, the wireless device 100a can communicate with other wireless devices, e.g., other wireless devices 100, cell phones, etc., over the wireless network 212. Likewise, the mobile computing devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile computing devices 100a and 100b can, for example, communicate with one or more services 230, 240, 250 and 260 and/or one or more content publisher 270 over the one or more wired and/or wireless networks 210. For example, a navigation service 230 can provide navigation information, e.g., map information, location information, route information, and other information, to the mobile computing device 100. In the example shown, a user of the mobile computing device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile computing device 100b (e.g., syncing services, software update services, activation services).

The mobile computing devices 100a and 100b can also access other data and content over the one or more wired and/or wireless networks 210. For example, content publishers 270, such as news sites, RSS feeds, web sites, blogs, social networking sites, developer networks, etc. can be accessed by the mobile computing device 100. Such access can be provided by invocation of web browsing function or application (e.g., a browser) in response to a user touching the Web object 114.

Figure 3:
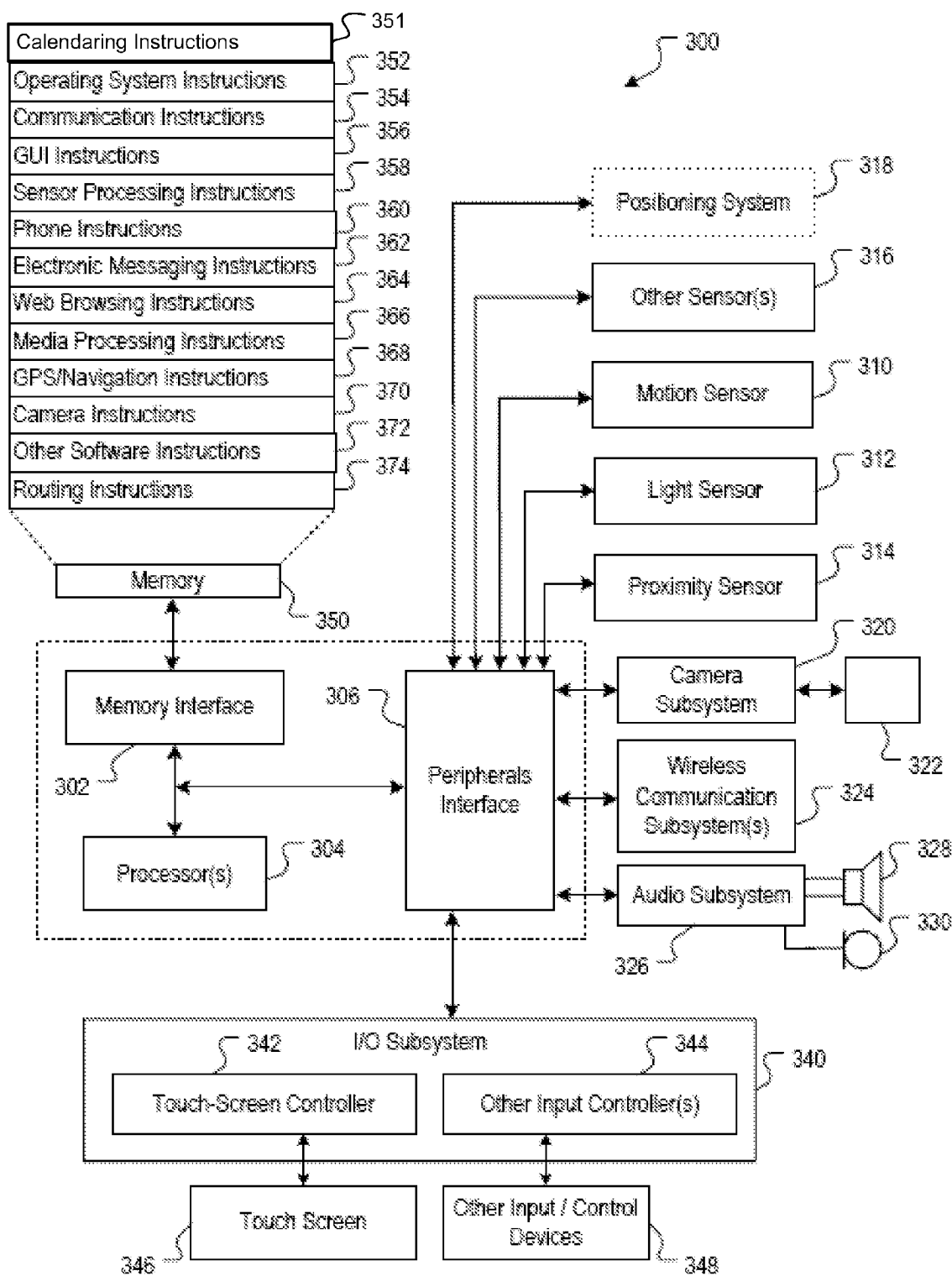
FIG. 3 is a block diagram illustrating an example implementation of a mobile computing device, according to an embodiment.

FIG. 3 is a block diagram 300 of an example implementation of the mobile computing device 100 of FIG. 1. The mobile computing device 100 can include a memory interface 302 one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile computing device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system 318 (e.g., a GPS receiver), a temperature sensor, a biometric sensor, or other sensing device, to facilitate related functionalities.

A camera subsystem 320 and an optical sensor 322, e.g., a charged coupled device (CCD) or a complementary metaloxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile computing device 100 is intended to operate. For example, a mobile computing device 100 may include communication subsystems 324 designed to operate over a GSM network, a GPRS network, an EDGE network, a Wi-Fi or WiMax network, and/or a Bluetooth™ network.

An audio subsystem 326 can be coupled to a speaker 328 and a microphone 330 to facilitate voice-enable functions, such as voice recognition, voice replication, digital recording, and telephony functions.

The I/O subsystem 340 can include a touch-screen controller 342 and/or other input controller(s) 344. The touch-screen controller 342 can be coupled to a touch screen 346. The touch screen 346 and touch-screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In some implementations, the mobile computing device 100 can present recorded audio and/or video files, such as MP3, AAC, and MPEG files. In some implementations, the mobile computing device 100 can include the functionality of an MP3 player, such as an iPod™. The mobile computing device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350, which is an embodiment of a machine readable storage medium, can store operating system instructions 352, for an operating system such as Darwin, RTXC, LINUX, UNIX, OS X, WINDOWS, or an embedded operating system such as VxWorks. The operating system may include instructions for handling basic system services and for performing hardware dependent tasks. In some implementations, the operating system can be a kernel (e.g., UNIX kernel).

The memory 350 may also store calendaring instructions 351 to facilitate operation of a calendar application. The memory 350 may also store communication instructions 354 to facilitate communicating with one or more additional devices, one or more computers and/or one or more servers. The memory 350 may include graphical user interface (GUI) instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; other software instructions 372 or data to facilitate other related processes and functions (e.g., security instructions, activation record); and/or routing instructions 374 to facilitate operation of various engines of the mobile computing device. The engines will be described below with respect to FIG. 6.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile computing device 100 may be implemented in hardware and/or in software, including in one or more signal processing and/or application specific integrated circuits.

Figure 4:
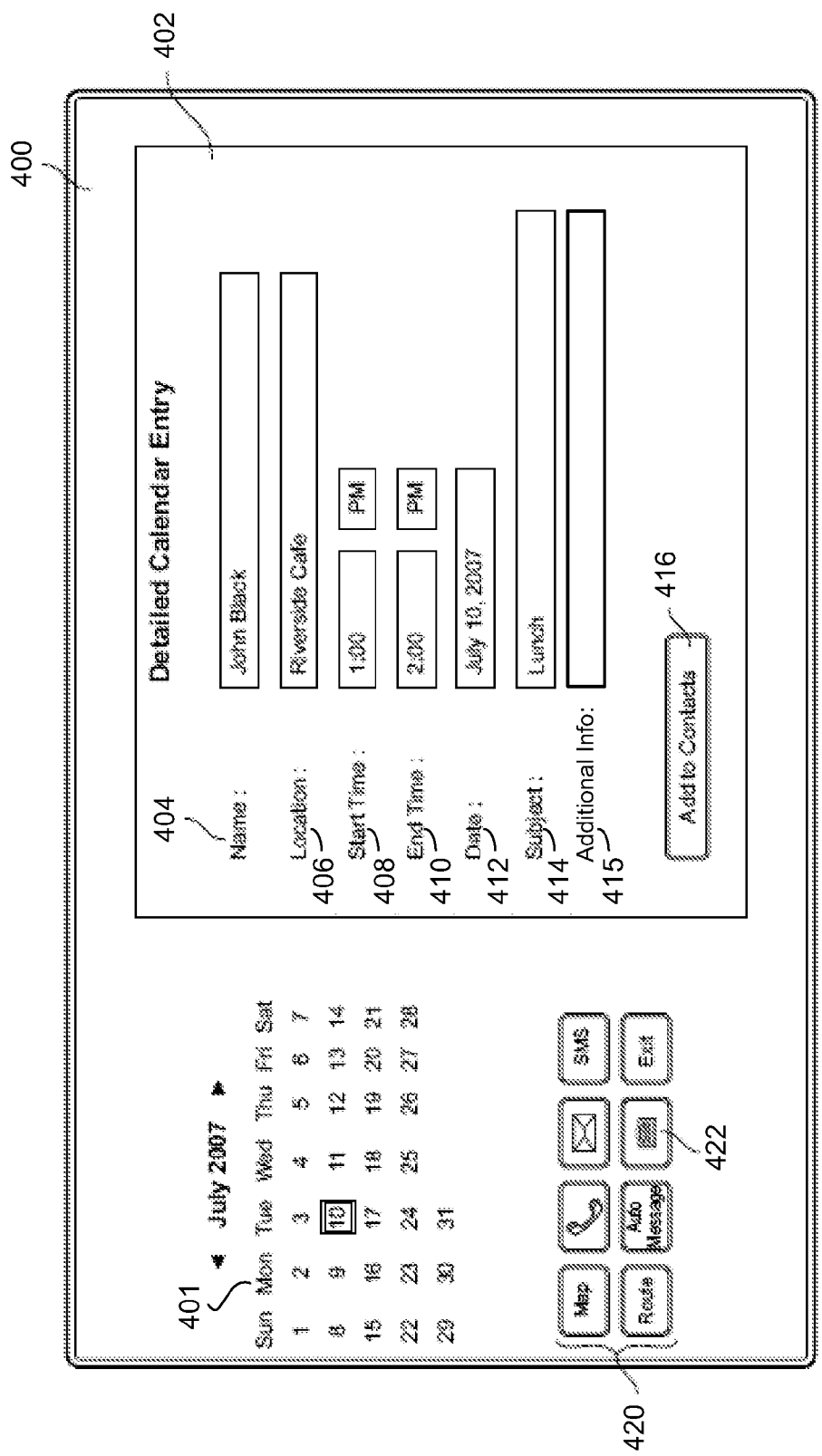
FIG. 4 is a block diagram illustrating an example graphical user interface displaying a detailed calendar entry, according to an embodiment.

FIG. 4 illustrates an example graphical user interface 400 showing a monthly calendar view 401 and a detailed calendar entry view 402. The monthly calendar view 401 shows a certain date, i.e., Jul. 10, 2007, highlighted. The detailed calendar entry view 402 can show the details for a calendar entry on the selected date. If more than one calendar entry is stored for the selected date, all the calendar entries stored for that date may be shown for the user to select from. In one example, if the user selected a calendar entry named "John Black," the detailed calendar entry view 402 can be presented to the user in response. The detailed calendar entry view 402 includes the name 404 of the person or entity to whom the calendar entry pertains, i.e., John Black. An associated location 406 corresponding to the calendar entry can also be included, i.e., Riverside Café. The associated location 406 can be an address or a descriptive name. The descriptive name can be associated with an address from a user's address book accessible by the calendar, or associated with an address determined from a database (e.g., accessible via the Internet). In this example, the location of the lunch with John Black in fact is not at his home, but is at a restaurant. Associated start and end times 408, 410 for the appointment can be shown along with the date 412. A subject field 414 can be provided, where a user can optionally provide a brief description relating to the calendar entry, e.g., lunch. An additional field 415 can be provided, where a user can optionally input additional information associated with the calendar entry, such as for example, optional contacts associated with the calendar entry who can be notified in case of delay and elevated to primary contacts.

In one embodiment, if John Black is not already included in the user's address book, the user can select the "add to contacts" button 416 and a graphical interface can be presented to the user to prompt the user for input to include in the contact information for John Black. In another implementation, the user can select the location associated with the calendar entry, e.g., Riverside Café, and add the location into the user's address book. In some implementations, if John Black is included in the user's address book, as soon as the user inputs the name John Black into the name field 404, the location field 406 can automatically populate with John Black's address retrieved from the address book. The user can then optionally revise the location, for example, to change to a restaurant location. In the example tool bar 420 shown in FIG. 4, an address book button 422 is shown. A user can select the address book button 422 to view contact information associated with John Black.

Figure 5:
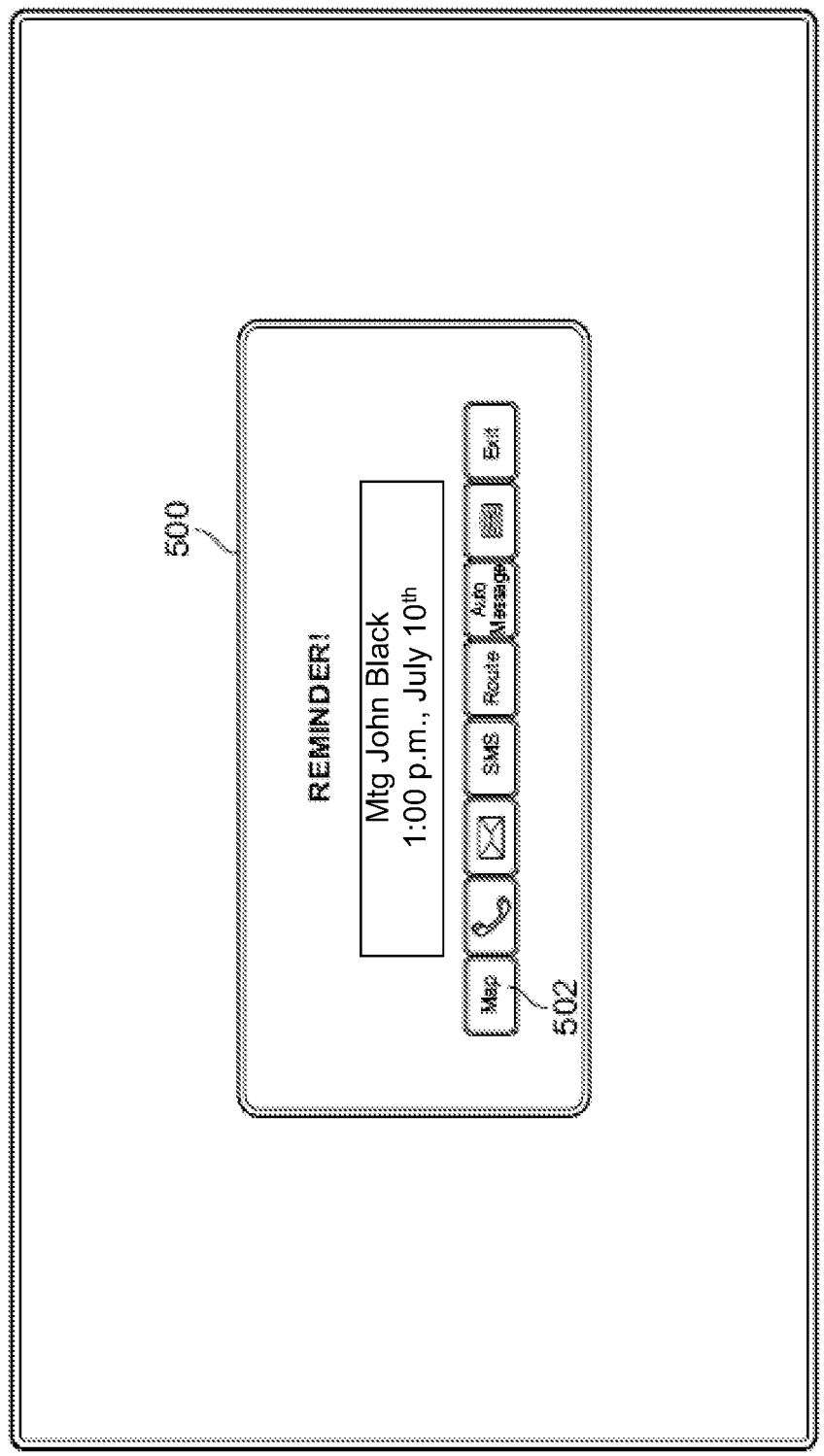
FIG. 5 is a block diagram illustrating an example graphical user interface displaying a calendar alarm indication, according to an embodiment.

In one embodiment, at an alarm time (e.g., a period of time prior to the meeting), an alarm indication 500 can be displayed to the user, as shown in FIG. 5. That is, as a user calendar setting, a user can select to be reminded of the calendar entry at the alarm time. In one embodiment, the alarm indication 500 can be superimposed on whatever image is displayed on a display at the time. The alarm indication 500 can indicate the calendar entry information and in one implementation, as shown, provide the buttons included in the tool bar 420 shown in the graphical user interface 400 of FIG. 4. A user can select the map button 502 to be provided a display of a map that includes an indication of a location corresponding to the calendar entry, i.e., the location of the meeting with John Black. In one embodiment, the alarm time can be dynamically determined according to the method described below with respect to FIG. 7. Alternatively, the alarm time may be set for a default period of time before the time associated with the calendar entry.

Figure 6:
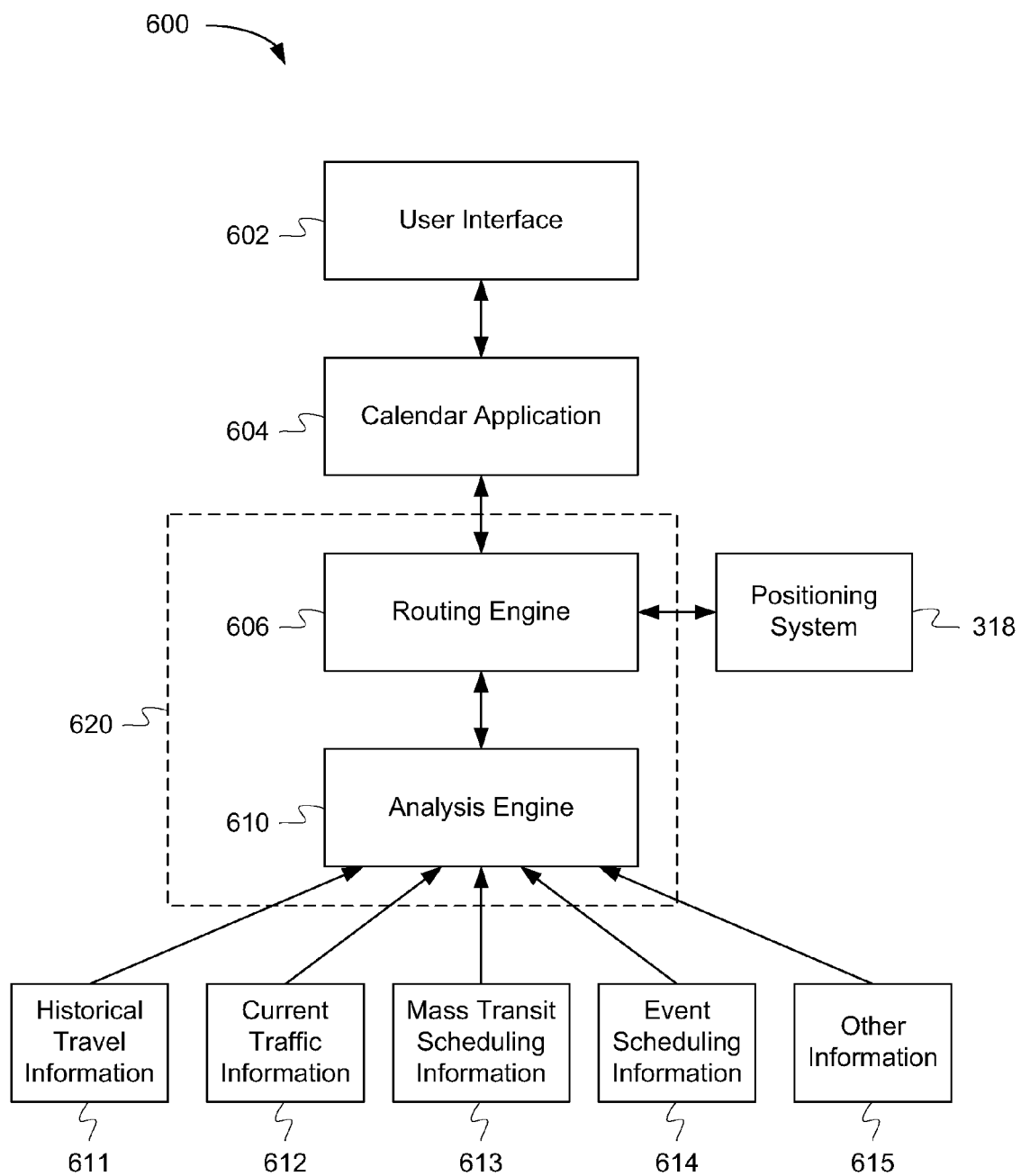
FIG. 6 is a block diagram illustrating the operation of a computing device, according to an embodiment.

FIG. 6 is a block diagram 600 illustrating the operation of a computing device, such as mobile computing device 100 or other non-mobile computing device. In one embodiment, the computing device can include user interface 602, calendar application 604, routing engine 606, positioning system 318 and analysis engine 610. The calendar application 604 can provide a time and location associated with a calendar entry to routing engine 606. The routing engine 606 can receive a current position of the mobile computing device from positioning system 318 and can determine a route between the current position and the associated location. For some computing devices, the current position can be determined via positioning system 318. The routing engine 606 can derive a route between two locations using existing or future routing technology. In one embodiment, the routing engine 606 can be intelligent, in the sense that alternative routes between the same two locations are obtained and analyzed to determine a suggested best route, taking into account factors, such as current or historical traffic conditions, as well as other forms of travel information. The routing engine 606 can communicate one or more derived routes to the analysis engine 610. The analysis engine 610 can analyze the one or more routes received from the routing engine 606. In one embodiment, the functionality of routing engine 606 and analysis engine 610 is combined in a single engine 620. In other embodiment, the functionality of analysis engine is integrated into calendar application 604.

In one embodiment, the one or more routes can be analyzed based on received travel information, including historical travel information 611 and current travel information. Current travel information may include a combination of information from various sources indicating factors that may currently affect the travel time along a chosen route. Current travel information can include current traffic information 612, mass transit scheduling information 613, event scheduling information 614, and/or other travel information 615. Based on the analysis, the analysis engine 610 can calculate an estimated travel time from the current location to the associated location at a current time. The estimated travel time can be dynamically determined by continuously recalculating the estimated travel time from a predetermined time before the meeting time up until the user reaches the location of the meeting or otherwise disables the alarm feature of the calendar application. An alarm indication can be displayed on the user interface 602 at an alarm time based on the estimated travel time. An estimated arrival time can be determined form the current time and the estimated travel time. If the estimated arrival time changes, a notification can be automatically sent (e.g., via email or SMS) to people and/or contacts associated with the calendar entry. Additionally, if it is determined that the estimated arrival time will exceed the associated time, in one embodiment, optional contacts associated with the calendar entry may be elevated to primary contacts and notified of their change in status, the associated time, and/or the estimated arrival time of the user.

In one embodiment, the computing device 100 can be location aware (i.e., can determine its current location). As shown in FIG. 3, in one implementation, the mobile computing device 100 can include a positioning system 318. In various implementations, the positioning system 318 can be provided by a separate device coupled to the mobile computing device 100, or can be provided internal to the mobile computing device 100 or other computing device. In some implementations, the positioning system 318 can employ positioning technology including a GPS, a cellular grid, television signals, Wi-Fi base stations, URIs or any other technology for determining the geographic location of a device. In other implementations, the positioning system 318 can be provided by an accelerometer and a compass using dead reckoning techniques. In such implementations, the user can occasionally reset the positioning system by marking the mobile computing device's presence at a known location (e.g., a landmark or intersection). In other implementations, the positioning system 318 can be provided by using wireless signal strength and one or more locations of known wireless signal sources to provide the current location. Wireless signal sources can include access points and/or cellular towers. Other techniques to determine a current location of the mobile computing device 100 can be used and other configurations of the positioning system 318 are possible.

Additionally, if the computing device is location aware, the user can be provided map and route information displaying on user interface 602. In one implementation, the positioning system 318 can communicate a current location of the mobile computing device to the routing engine 606 for determination of a route.

In one embodiment the estimated travel time can be determined by analyzing received travel information. The travel information may include historical travel information 611. Historical travel information 611 may include information stored in a history database about the average time associated with navigating a route. Historical travel information 611 may be derived from the user's own past trips or from external sources incorporating data from one or more other users and/or other computing devices. In some implementations, the average time to navigate a route can be dependent upon the time of day the route is being navigated. For example, a section of highway in a large city may be slow at 8:00 a.m. due to rush hour, while the same section of highway might be clear at 10:00 p.m. Thus, the historical travel information 611 can include a time of day for which the average is to be computed. For example, the analysis engine 610 can average the five navigations taken at the closest times of day to the corresponding calendar entry time, e.g., the 1:00 p.m. lunch with John Black. In further implementations, recentness of a navigation can be factored in to the estimation of navigation time. For example, the five most recent navigations of a road may be used to calculate an estimated navigation time associated with the route. In other implementations, any of these factors can be combined. For example, the time of day can be balanced with the recency of a navigation to produce the five most recent navigations, which are closest in time of day to the calendar entry time.

In one embodiment, in addition to historical travel information, current traffic information 612 can be used to determine the estimated travel time. For example, the analysis engine 610 may receive traffic information or road conditions for either streets included within the route determined by routing engine 606 or for all streets within a certain radius of the start and end locations of the route. In one embodiment, the traffic information can be obtained, from an external traffic feed. In another embodiment, the current traffic information can be obtained from users of other computing devices. If a sufficient number of devices are in use in a given area, micro travel information can be collected from the devices. Micro travel information can include an amount of time it takes the mobile computing device to cover a small distance. An average can be computed from all the mobile devices in the area. The micro travel information can be applied to the user's route information to construct an accurate current travel time along the route. The analysis engine 610 can determine the effect of current traffic on the estimated travel time. In one embodiment, this determination can include adding the estimated delay attributable to current traffic to the historical average travel time.

Mass transit scheduling information 613 may also be factored into the estimated travel time determined by the analysis engine 610. In some embodiments, either a portion or all of the travel along the chose route may be accomplished using mass transit rather than an automobile or other personal motor vehicle. For example, mass transit scheduling information 613 may include schedules for airplanes, buses, trains, subways, ferries, or other forms of mass transit. In one embodiment, for example, a portion of the trip from the user's current location to the location associated with a meeting can be accomplished by taking a ferry. The departure and arrival times of the ferry are known and the estimated travel time can be determined with that knowledge. The travel times for the ferry, as well as the estimated time travel time to and from the ferry docks, are combined to form the estimated travel time. Similar determinations are made if one or more other forms of mass transit are used to navigate the chosen route.

In addition, event scheduling information 614 may be used to determine the estimated travel time. The occurrence of certain events may impact travel times in or around certain areas. For example, sporting events may cause increased traffic in the area around the stadium, leading to longer travel times in that area. Event scheduling information 614, received by the analysis engine 610, can be used to accurately estimate the travel time on a certain day and time. Other events which may be contained in event scheduling information 614, may include concerts, movies, retail store sale events, public gatherings, or any other large scale public or private event.

Figure 7:
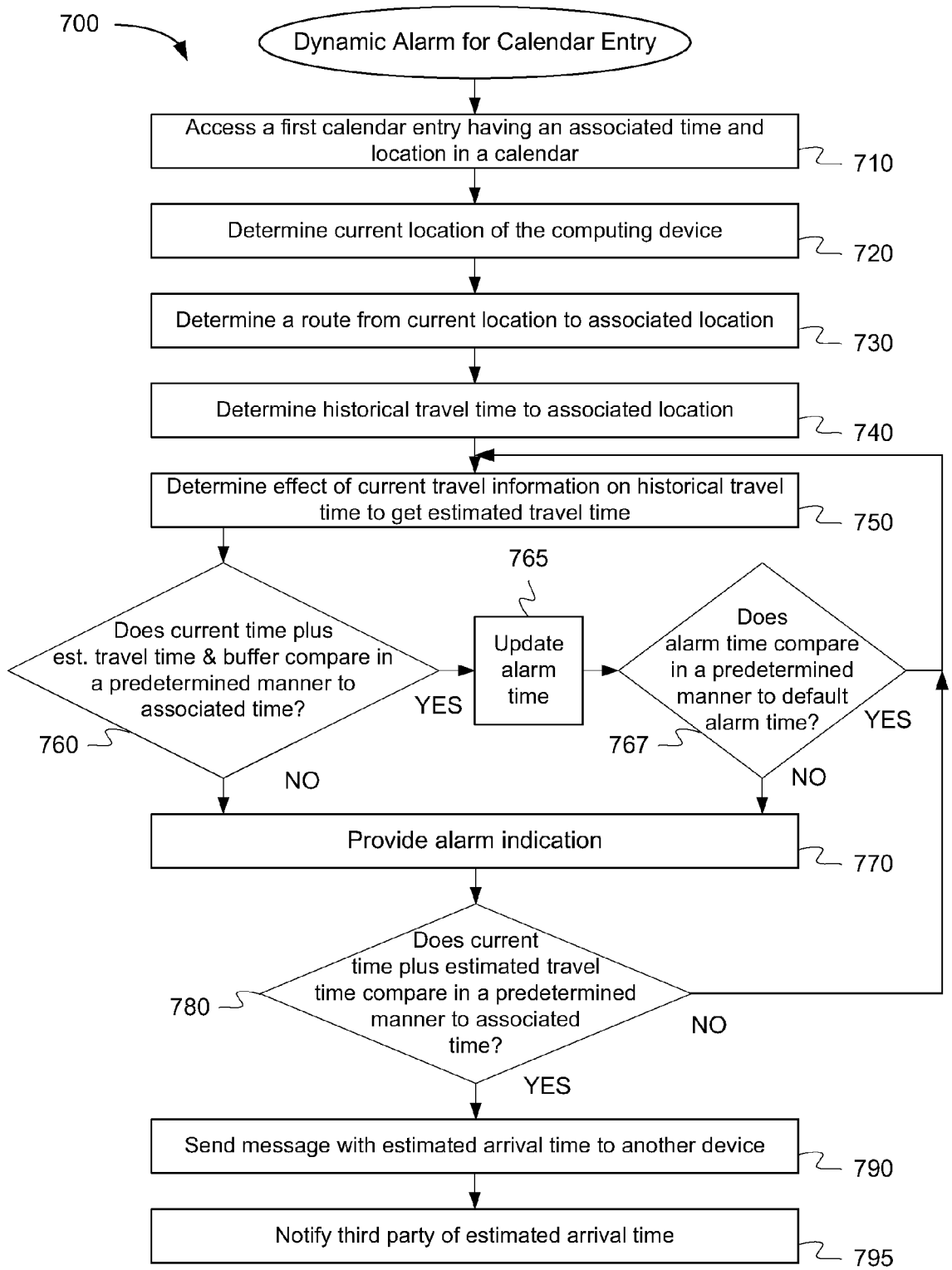
FIG. 7 is a flow chart illustrating a dynamic alarm indication method for a calendar application, according to an embodiment.

FIG. 7 is a flow chart illustrating a dynamic alarm indication method for a calendar application, according to an embodiment. This embodiment, as with other embodiments can be performed on a mobile device or a stationary system such as a desktop computer. The method 700 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to dynamically determine an estimated travel time to a location associated with a calendar entry and provide an alarm indication at an alarm time based on the estimated travel time. In one embodiment, method 700 can be performed by a combination of calendar application 604, routing engine 606 and analysis engine 610.

Referring to FIG. 7, at block 710, method 700 can access a first calendar entry in a calendar, such as calendar application 604. The calendar entry may have an associated time and an associated location, as shown in the calendar entry of FIG. 4. The example of FIG. 4 shows a 1:00 p.m. meeting at the Riverside Café. The calendar entry may be received by way of user input into the computing device providing the calendar feature. In another example, a calendar entry being received can be an invitation to a meeting send by a third party. In yet another example, a re-occurring meeting can be scheduled by a user of the computing device or by a third party, and the re-occurring meeting can be automatically represented by a series of calendar entries added to the calendar. Additionally, a meeting can be received by the device from an external device in communication (e.g., synched) with the computing device.

At block 720, method 700 can determine a current location of the mobile computing device or other device. The current location of a mobile computing device may be determined by positioning system 318, as described above with respect to FIG. 6. At block 730, method 700 determines a route from the current location of the computing device to the location associated with the calendar entry. The route may be determined by routing engine 606, as described above with respect to FIG. 6. In one embodiment, the route choice can take into account, historical travel information 611, current traffic information 612, mass transit scheduling information 613, event scheduling information 614, other travel information 615, or any combination thereof. At block 740, method 700 can determine a historical travel time from the current location to the associated location along the determined route. In one embodiment, the historical travel time serves as a baseline for dynamically determining the estimated travel time.

At block 750, method 700 can determine the effect of current travel information on the historical travel time to get an estimated travel time. Current travel information may include, for example, current traffic information 612, mass transit scheduling information 613, event scheduling information 614, and/or other travel information 615. The current travel information may alter the historical travel time determined at block 740. For example, if the historical travel time from the current location of the computing device to a meeting at the Riverside Café was 25 minutes, but there is currently a 10 minute delay based on current traffic information 612, the estimated travel time is 35 minutes.

The estimated travel time can be dynamically calculated to maintain a current accurate estimate of the travel time. This allows an alarm indication to be provided at a time early enough for the user of the computing device to travel from the current location to the location of the calendar entry and still arrive at or before the associated time. In one embodiment, the estimated travel time can be first calculated as soon as the calendar entry is created using, for example, historical travel information, mass transit scheduling information, event scheduling information, or other travel information. In alternative embodiments, the estimated travel time can be first calculated at a predetermined time interval (or a set of time intervals) before the time associated with the calendar entry. For example, the estimated travel time may be first calculated at 12:00 a.m. on the day of the meeting. In one embodiment, the estimated travel time can include a user level buffer period, which extends the estimated travel time by a predetermined amount of time, e.g., 5 minutes. The user level buffer period can allow extra time for the user to accomplish travel that may not be factored into the estimate, such as for example, walking out to their car, or walking into a building from the parking lot.

Once the estimated travel time is determined at block 750, method 700 proceeds to block 760. At block 760, method 700 can determine whether the current time plus estimated travel time compares in a predetermined manner to (e.g., is less than) the time associated with the calendar entry. In other words, method 700 determines whether, the user would arrive before the scheduled meeting time, if they left for the meeting right away. In one embodiment, method 700 can also consider an alert buffer period. The user may optionally configure the alert buffer to factor in a period of time in addition to the estimated travel time. The alert buffer period allows the user to adjust their travel plans in the event that the estimated travel time will be longer than expected, potentially making the user late for the appointment. In one embodiment, the alert buffer period can be a fixed amount of time, such as for example 15 minutes. In another embodiment, the alert buffer period can be a percentage of the estimated travel time, e.g., 10 percent, which is not to exceed a set amount of time (e.g., 30 minutes). If the current time plus the estimated travel time and the alert buffer period compares in a predetermined manner to (e.g., is less than) the associated time, method 700 can update the alarm time based on the estimated travel time at block 765. In the event that method 700 is no longer able to recalculate the estimated travel time (e.g., due to a network error), method 700 can store the most recent alarm time so that an alarm indication can still be provided at the most recently calculated time. At block 767, method 700 can compare the updated alarm time to a default alarm time. The default alarm time may be a predetermined fixed amount of time prior to the associated time (e.g., 15 minutes). If the updated alarm time compares in a predetermined manner to (e.g., is sooner than) the default alarm time, method 700 returns to block 750 where the estimated travel time is recalculated. Upon returning to block 750, any changes in the current travel information since the last travel time estimate calculation can be applied to the historical travel information to determine a new estimated travel time. In one embodiment, the estimated travel time may be immediately recalculated, however in other embodiments, method 700 may pause for a predetermined period of time (e.g., 10 minutes) before performing calculating a new estimated travel time. Method 700 then proceeds again to block 760. If at block 767, the updated alarm time does not compare in a predetermined manner to (e.g., is later than) the default alarm time, method 700 can continue to block 770 and the alarm indication can be provided at the default alarm time. The comparison at block 767 can be done optionally in response to input from the user.

If at block 760, at either the first or any subsequent repetition, it is determined that the current time plus the estimated travel time and the alert buffer period does not compare in a predetermined manner to (e.g., is not less than) the time associated with the calendar entry, method 700 proceeds to block 770. At block 770, an alarm indication can be provided for the calendar entry. The alarm indication may be displayed on a display as shown in FIG. 5. In other embodiments, the alarm indication may be audible, tactile (e.g., a vibration of the computing device), or any combination of visual, audible and tactile alarms. In one embodiment, method 700 proceeds to block 770 if the current travel time plus the estimated travel time is within a certain proximity to the associated time. For example, if the current time plus the estimated travel time is within 10 minutes of the associated time, the alarm indication will be provided at block 770. In one embodiment, the alarm indication indicates a time at which the user should leave their current location in order to arrive at the associated location by the associated time (e.g. "Leave for meeting with John Black in 10 minutes").

According to the operations described above, the estimated travel time can be dynamically determined during a time period between a certain time before the time associated with the calendar entry and the time at which an alarm indication can be provided, reminding the user that it is time to leave to travel to the meeting for which the calendar entry was created. The regular calculation of the estimated travel time ensures that an accurate estimate is used in order to give the user sufficient notice of the calendar entry.

After the alarm indication is provided at block 770, method 700 proceeds to block 780. At block 780, method 700 can determine whether the current time plus the estimated travel time compares in a predetermined manner to (e.g., is greater than) the time associated with the calendar entry. In other words, method 700 determines whether the user is going to be late for the meeting. If the current time plus the estimated travel time does not compare in a predetermined manner to (e.g., is not greater than) the associated time, method 700 returns to block 750 and can recalculate the estimated travel time. If the current time plus the estimated travel time compares in a predetermined manner to (e.g., is greater than) the associated time, method 700 proceeds to block 790. At block 790, method 700 can send a message to another device with the user's estimated arrival time at the meeting location. The estimated arrival time can be determined by the estimated travel time plus the current time. The other device may be, for example, the computing device of another participant in the meeting (i.e., John Black, in the example discussed above). In one embodiment, the estimated travel time is regularly recalculated even after the alarm indication is provided, so that an estimated arrival time may be used for purposes of the notification at block 790.

At block 795, method 700 can optionally notify a third party device of the estimated arrival time of the user. In one embodiment, the third party device can be a device belonging to or used by a person optionally associated with the calendar entry. For example, if method 700 determines that the user will be late based on comparing the current time to the estimated travel time, method 700 may send a notification to another person (who was initially optionally associated with the calendar entry) instructing them to attend the meeting associated with the calendar entry. As a result, the third party may be elevated from an optional contact to a primary contact. The notification may be one of a number of notification mechanisms, including but not limited to, email, Short Message Service (SMS) Push Notification, Twitter message, etc. The third party who is notified can be a default third party, set ahead of time, or can be entered by the user when the calendar entry is created, for example in field 415 of FIG. 4. In one embodiment, the notification can be sent as soon as method 700 determines that the current time plus the estimated travel time compares in a predetermined manner to (i.e., is greater than) the associated time. In another embodiment, the notification can be sent if the current time plus the estimated travel time exceeds the associated time by a certain threshold value, such as for example, 15 minutes.

In one embodiment, the dynamic alarm system for a calendar system may be implemented on a non-mobile computing device. The dynamic alarm system for a non-mobile computing device may function similarly to method 700 described above. One difference may be how the current location of the computing device is determined. For non-mobile computing devices, the current position can be an anticipated location (e.g., based on a default address such as a home or work address, and/or based on previous calendar entries, and/or based on GPS data accessible by the non-mobile computing device from a GPS receiver used the user in a mobile device or in the user's car, etc.). In one embodiment, once the current position of the computing device is known, the estimated travel time may calculated in a similar fashion to that of a mobile computing device with a built in positioning system (e.g., a GPS system). An alarm indication can be provided on the non-mobile computing device based on the estimated travel time which can take into account the effect of current traffic information and other travel information. In another embodiment, the calendar application and/or calendar entries can be stored on a first device, while the alarm indication is provided on a second device. For example, a mobile device can be used to provide the alarm indication and can access calendar entries stored remotely (e.g., on a remote server). The remote device can push data to the mobile device to display an alarm indication.

Figure 8:
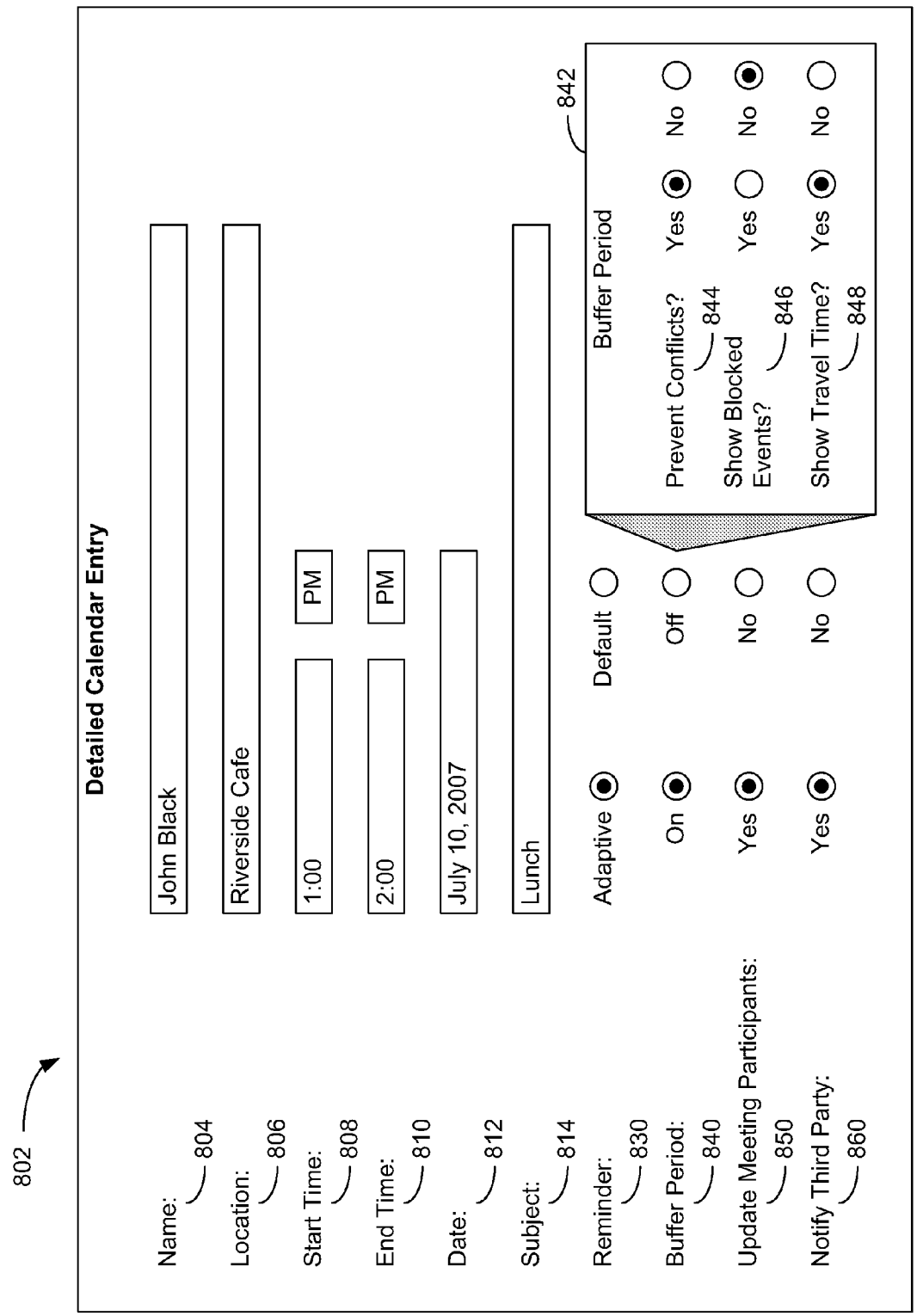
FIG. 8 is a block diagram illustrating a detailed calendar entry screen, according to an embodiment.

FIG. 8 is a block diagram illustrating a detailed calendar entry screen, according to an embodiment. The detailed calendar entry 802 can include the name 804 of the person or entity to whom the calendar entry pertains, i.e., John Black. An associated location 806 corresponding to the calendar entry is also included, i.e., Riverside Café. Associated start and end times 808, 810 for the calendar entry can be shown along with the date 812. A subject field 814 can be provided, where a user can optionally provide a brief description relating to the calendar entry, e.g., lunch.

Detailed calendar entry 802 further includes several options for a reminder. A first option 830 can allow a reminder (i.e., alarm indication) to be either adaptive or set to a default value. An adaptive reminder provides an alarm indication for the calendar entry at an alarm time based on an estimated travel time. The estimated travel time is dynamically determined as discussed above with respect to FIG. 7. The adaptive reminder ensures that the alarm time occurs no less than the estimated travel time before the start time 808 associated with the calendar entry. A default reminder can be set to provide an alarm indication a predetermined period of time before the associated time. The predetermined period of time may be, for example, 15 minutes, 30 minutes, or some other period of time.

A second reminder option is a buffer period 840. The buffer period 840 may be set to either ON or OFF. The buffer period 840 can factor in an additional period of time to the estimated travel time as an alert buffer, so that the alarm notification will be provided a period of time before the user actually has to leave to travel to the appointment. When buffer period 840 is turned ON (e.g., by selecting the appropriate radio button), a buffer period menu 842 can be displayed. In one embodiment, buffer period menu 842 can offer the options of prevent conflicts 844, show block events 846 and show travel time 848. When the prevent conflicts option 844 is selected, the user can be prevented from scheduling a second calendar entry at any time less than the estimated travel time before the associated time of the first calendar entry. That is, when the user creates a calendar entry having an associated time of 1:00 p.m., an estimated travel time is determined, which may be, for example, 25 minutes. When option 844 is selected, the user can be prevented from creating any other calendar entry that occurs between 12:35 p.m. and 1:00 p.m. on the same day. The show blocked events option 846 is applicable if option 844 is not enabled. When option 846 is selected, events that are in conflict with the estimated travel time of another event can still be shown when viewing the calendar. The show travel time option 848 can display the estimated travel time associated with an event on the calendar. For example, the estimated travel time may be shown on the calendar as a lightly shaded or cross-hatched period of time immediately preceding the start time 808 of the calendar entry.

A third reminder option is the update meeting participants option 850. When selected, option 850 can enable the sending of updates with a user's estimated arrival time to the other participants associated with the calendar entry. The update message is described above with respect to block 790 of FIG. 7. A fourth reminder option is the notify third party option 860. When selected option 860 can enable the sending of notifications to a specified optional contact if it is determined that the user will be late for the meeting associated with the calendar entry. The notification is described above with respect to block 795 of FIG. 7.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method for generating an alarm indication for a calendaring application of a computing device without a positioning system capability, the method comprising:
   determining an event time, an event location, and a default alarm time associated with a calendar entry of the calendaring application, wherein the default alarm time is configured to occur at a predetermined time prior to the event time;
   storing an anticipated current location of the computing device based on at least one of a default address stored on the computing device, a location of the computing device based on travel associated with a previous calendar entry, or location data received by an auxiliary device;
   calculating an estimated travel time from the anticipated current location of the computing device to the event location using route travel information;
   calculating an updated alarm time based at least in part on the estimated travel time; and
   replacing the default alarm time with the updated alarm time when it is determined that the updated alarm time occurs sooner than the default alarm time.

2. The method of claim 1, wherein the positioning system comprises at least one of a global positioning receiver (GPS), a cellular network transceiver, or a wireless communications subsystem.

3. The method of claim 1, further comprising:
   providing a buffer period in the calendaring application, wherein the buffer period refers to a predetermined period of time that occurs prior to the estimated travel time.

4. The method of claim 1, wherein the calendaring application is stored on the computing device and the updated alarm time is calculated by a second computing device.

5. The method of claim 1, wherein calculating the updated alarm time comprises determining current traffic information along a travel route between the anticipated current location of the computing device and the event location.

6. The method of claim 1, further comprising:
   providing an adaptive alarm time, wherein the adaptive alarm time occurs no later than the estimated travel time before the event time associated with the calendar entry.

7. The method of claim 1, wherein the auxiliary device comprises at least one of a built-in global positioning receiver (GPS), a cellular network transceiver, or a wireless communications subsystem.

8. The method of claim 1, wherein the updated alarm time is calculated by continuously recalculating the estimated travel time between the anticipated current location of the computing device and the event location associated with the calendar entry.

9. The method of claim 1, wherein calculating the estimated travel time is based at least in part on previously recorded travel information.

10. At least one non-transitory computer readable storage medium configured to store instructions that, when executed by at least one processor of a computing device, cause the computing device to perform steps that include:
    determining an event time, an event location, and a default alarm time associated with a calendar entry of a calendaring application, wherein the default alarm time is configured to occur at a predetermined time prior to the event time;
    storing an anticipated current location of the computing device based on at least one of a default address stored on the computing device, a location of the computing device based on travel associated with a previous calendar entry, or location data received by an auxiliary device;
    calculating an estimated travel time from the anticipated current location of the computing device to the event location using route travel information;
    calculating an updated alarm time based at least in part on the estimated travel time; and
    replacing the default alarm time with the updated alarm time when it is determined that the updated alarm time occurs sooner than the default alarm time.

11. The at least one non-transitory computer readable storage medium of claim 10, wherein the steps further include:
    notifying one or more participants associated with the calendar entry when there is a deviation in the estimated travel time.

12. The at least one non-transitory computer readable storage medium of claim 10, wherein the steps further include:
    providing a buffer period in the calendaring application, wherein the buffer period refers to a predetermined period of time that occurs prior to the estimated travel time.

13. The at least one non-transitory computer readable storage medium of claim 10, wherein the computing device is without at least one of an operable global positioning receiver (GPS), an operable cellular network transceiver, or an operable wireless communications subsystem.

14. A computing device configured to generate an alarm indication for a calendaring application executing on the computing device, the computing device comprising:
    at least one processor; and
    at least one memory configured to store instructions that, when executed by the at least one processor, cause the computing device to:
       determine an event time, an event location, and a default alarm time associated with a calendar entry of the calendaring application, wherein the default alarm time is configured to occur at a predetermined time prior to the event time;
       store an anticipated current location of the computing device based on at least one of a default address stored on the computing device, a location of the computing device based on travel associated with a previous calendar entry, or location data received by an auxiliary device;
       calculate an estimated travel time from the anticipated current location of the computing device to the event location using route travel information;
       calculate an updated alarm time based at least in part on the estimated travel time; and replace the default alarm time with the updated alarm time when it is determined that the updated alarm time occurs sooner than the default alarm time.

15. The computing device of claim 14, wherein the at least one processor further causes the computing device to:
provide a buffer period in the calendaring application, wherein the buffer period refers to a predetermined period of time that occurs prior to the estimated travel time.

16. The computing device of claim 14, wherein calculating the updated alarm time comprises determining current traffic information along a travel route between the anticipated current location of the computing device and the event location.

17. The computing device of claim 14, wherein the at least one processor further causes the computing device to:
provide an adaptive alarm time, wherein the adaptive alarm time occurs no later than the estimated travel time before the event time associated with the calendar entry.

18. The computing device of claim 14, wherein the auxiliary device comprises at least one of a built-in global positioning receiver (GPS), a cellular network transceiver, or a wireless communications subsystem.

19. The computing device of claim 14, wherein the updated alarm time is calculated by continuously recalculating the estimated travel time between the anticipated current location of the computing device and the event location associated with the calendar entry.

20. The computing device of claim 14, wherein calculating the estimated travel time is based at least in part on previously recorded travel information.

* * * * *